US006377677B1

(12) United States Patent
Ackerley et al.

(10) Patent No.: US 6,377,677 B1
(45) Date of Patent: Apr. 23, 2002

(54) TELECOMMUNICATIONS NETWORK HAVING SUCCESSIVELY UTILIZED DIFFERENT NETWORK ADDRESSES TO A SINGLE DESTINATION

(75) Inventors: Roger G Ackerley, Woodbridge; Peter B Key, Woodbriodge; Mark Woolley, Ipswich, all of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/068,229

(22) PCT Filed: Dec. 4, 1997

(86) PCT No.: PCT/GB97/03357

§ 371 Date: May 5, 1998

§ 102(e) Date: May 5, 1998

(87) PCT Pub. No.: WO98/28924

PCT Pub. Date: Jul. 2, 1998

(30) Foreign Application Priority Data

Dec. 20, 1996 (EP) ............................................. 96309427

(51) Int. Cl.[7] ............................. H04M 3/00; H04M 5/00
(52) U.S. Cl. .............. 379/279; 379/221.03; 379/112.04
(58) Field of Search ........................ 379/221.01–221.15, 379/220.01–219, 279, 210.01–210.03, 211.01–211.05, 111, 112.01–112.09, 133, 134; 370/351–356

(56) References Cited

U.S. PATENT DOCUMENTS

| 5,317,566 A | * | 5/1994 | Joshi ............................ 370/60 |
| 5,526,414 A | * | 6/1996 | Bedard et al. ............... 379/221 |
| 5,715,304 A | * | 2/1998 | Nishida et al. ............. 379/114 |
| 5,838,769 A | * | 11/1998 | McNeil et al. ................ 379/14 |

FOREIGN PATENT DOCUMENTS

WO    WO-96/11551    *   4/1996      ............ H04Q/3/00

OTHER PUBLICATIONS

Dynamic Network Evolution With Examples from AT&T's Evolving Dynamic Network, IEEE Communications Magazine, vol. 33, No. 7, Jul. 1, 1995, pp. 26–39.*

* cited by examiner

Primary Examiner—Ahmad F. Matar
Assistant Examiner—Benny Q. Tieu
(74) Attorney, Agent, or Firm—Nixon & Vanderhye P.C.

(57) ABSTRACT

To provide secure communications to a PBX (20,22) the PBX is connected to two different local exchanges of the PSTN. On recognising a telephone number designating calls to the PBX service switching points (2) apply to service control points (8) for route translations. The SCP (8) directs calls though the network alternately to network connections on one DLE (say 1c) and then to the other DLE (1b). In the event of a predetermined number of call failure on one of the route all subsequent calls are directed to the other route until a predetermined number of call failures occur on the other route where upon consecutive calls are again offered alternately.

15 Claims, 6 Drawing Sheets

TELECOMMUNICATIONS NETWORK HAVING SUCCESSIVELY UTILIZED DIFFERENT NETWORK ADDRESSES TO A SINGLE DESTINATION

BACKGROUND OF THE INVENTION

1. Field of the Invention

The present invention relates to telecommunications networks and more particularly to providing high reliability communications to apparatus connected to such networks.

2. Related Art

Public switched telecommunications networks (PSTN) usually comprise local exchanges providing direct service to customers and trunk exchanges which provide interconnection between the local exchanges by way of a trunk network. Typically, a telephone communication involves a customer on one local exchange being connected through the local exchange to a first trunk exchange. A trunk connection is then made to a second trunk exchange to which the destination local exchange is connected. Finally a connection is made through the destination local exchange to the destination customer.

Now in a simple network of the above kind where each local exchange is connected to any one trunk exchange, even if the trunk exchanges are fully interconnected it is possible for a single failure (for example accidental damage to a single cable link between any two of the exchanges in use) to result in substantial call losses.

In practice a more secure network is obtained by connecting each local exchange to two (or more) trunk exchanges so that if a first connection is out of order an alternative route may be attempted.

In early stages flexible routing was introduced in the form of automatic alternative routing (AAR) allowing traffic on overloaded direct routes between the exchanges to be diverted via alternative pre-assigned routes. In AAR the alternative routes from a given source node to a given destination node of the network are predetermined in a fixed ranking so that for each call blocked on the direct route the control equipment always offers the first choice alternative route. If the first choice alternative route is not available then the second choice alternative route is tried until all of the alternative routes are tested.

In a further development of AAR such as that disclosed in U.S. Pat. No. 3,394,231, longer routes involving a plurality of trunk exchanges may be offered as alternative routes to take advantage of faster switching speeds of modern telecommunications equipment.

In a still further development of AAR disclosed in European patent number 229494, a form of sticky-random alternative routing is disclosed in which calls between a first node and a destination node are offered by a preferred route and if the preferred route is not available calls are directed to a current nominated alternative route and each call failing on the first preferred route continues to be directed to the same alternative route until the nominated alternative route also fails at which point a replacement nomination for the current alternative route is made.

Such systems are useful when a common network management system and/or a common channel signalling system such as CCITT Signalling System 7 (c7) are in use. However, where the PSTN is using a different signalling system to that of connected equipment, for example when providing interconnection between customers private branch exchanges (PBX), the signalling system in use between PBXs is likely to be of the kind known as DPNSS. Thus, simply connecting a PBX to a plurality of local exchanges may result in end-to-end call clearing by the PBX signalling without the network recognising that a failure has occurred. In practice DPNSS is likely to send a CRM (congestion) message from the terminating local exchange to the originating PBX the message being imbedded in a C7 (NUP) signalling message.

SUMMARY OF THE INVENTION

According to a first aspect of the present invention there is provided a method of routing calls in a communications network in which a destination has a single network number and at least two network addresses, each network address representing a connection to a respective destination telephone exchange, the method comprising, on receipt of a call for the destination number, analysing the network number to select which of the at least two network addresses the call is to be directed to such that successive calls are directed to available ones of the network addresses in a sequential manner, selecting a route through the network to the selected network address and monitoring network signals to determine the success or failure of the call, and, in the event of failure of the call, determining whether calls to the currently selected network address have failed on a predetermined number of consecutive call attempts and, if so, barring subsequent calls to the selected network address until such time as calls directed to another of the at least two network addresses have failed a predetermined number of times.

According to a second aspect of the present invention a telecommunications network comprising a multiplicity of local exchanges interconnected by a plurality of trunk exchanges such that calls arising on any network address designating a customer connection to one of the local exchanges may be connected to any other network address in the communications system, the system translating digits defining a telephone number received from any network address into a destination network address to permit the establishment of a communications call between a calling network point and a destination network point characterised in that at least one telephone number represents a plurality of network addresses at least some of which on a first of said local exchanges and at least some others of which are on a different one of said local exchanges, each of said network addresses representing a route to a common customer communications equipment destination, control means of the network being responsive to signals received indicating a call for said customer equipment to analyse the number to select which of the network addresses the call is to be directed to such that successive calls are directed to network addresses representing different available routes in a sequential manner, the control means causing a route to be set up through the network to the selected network address and monitoring network signals to determine success or failure of the call and in the event of failure of the call determining from data relating to the selected network address if a predetermined number of consecutive call attempts to the selected network address have failed and if so barring subsequent calls to the selected network address until such time as calls directed to another of the local exchanges has failed a predetermined number of times.

Preferably the communications network is in the form of an intelligent network comprising a service control point and service switching point, the service switching points being triggered to apply to the service control point for routing information to handle calls to designated network telephone numbers representing a multiply connected PBX.

BRIEF DESCRIPTION OF THE DRAWINGS

A telecommunications network in accordance with the invention using the method of routing according to the invention will now be described by way of example only with reference to the accompanying drawings of which.

DETAILED DESCRIPTION OF EXEMPLARY EMBODIMENTS

Figure 1:
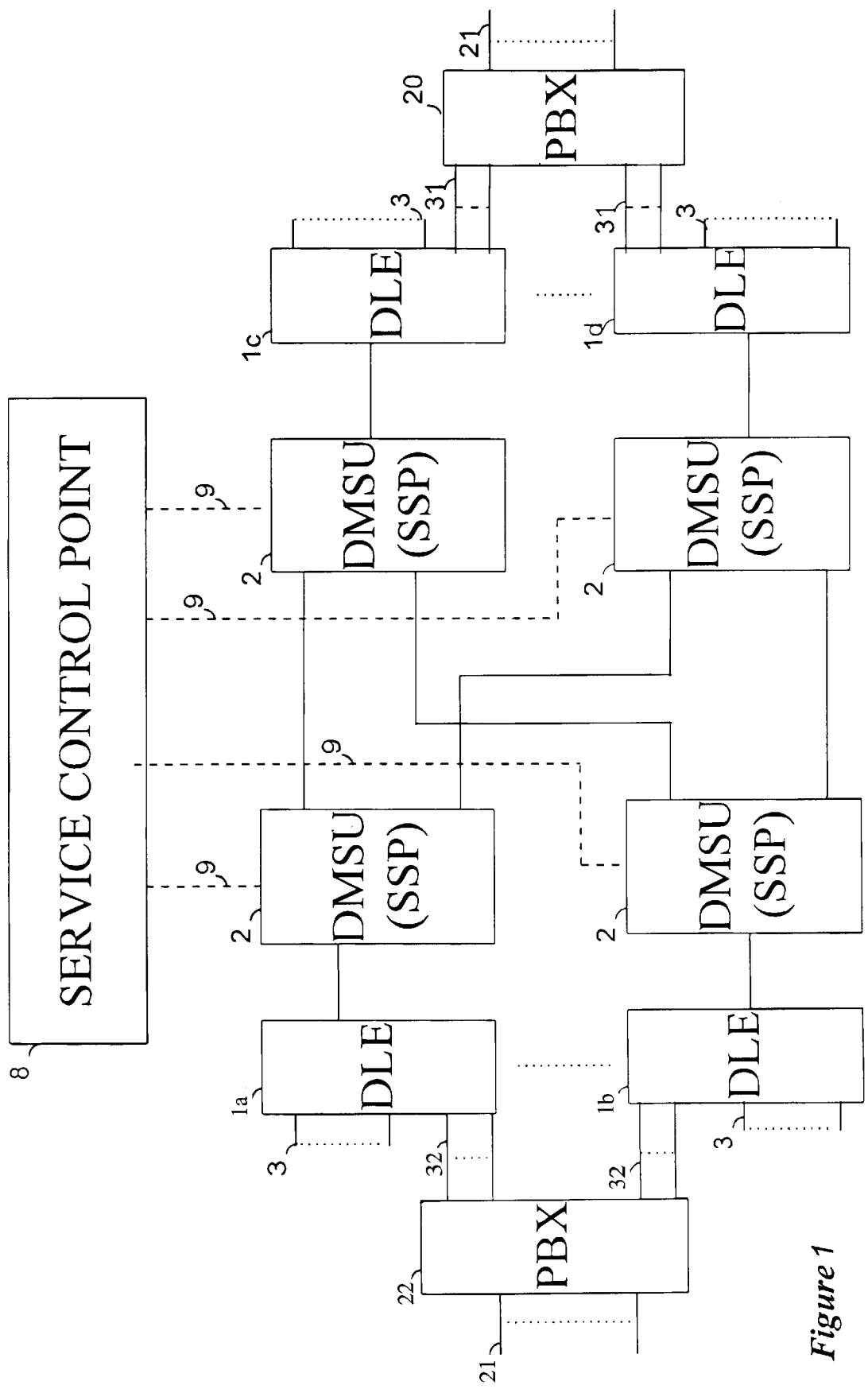
FIG. 1 is a schematic representation of the network.

Referring first to FIG. 1, a typical "intelligent network" is shown schematically, with digital local exchanges (DLE) 1 each having connections to customers via local access links 3. The DLEs 1a, 1b, 1c and 1d are fully interconnected by a trunk network having digital main switching units (DMSUs) 2 which are also referred to herein as service switching points ISSPs). Communication between the digital local exchanges and the DMSUs and inter-DMSU signalling is carried in a signalling channel of time division multiplexed digital communication links. These links use C7 signalling with intelligent network applications protocol (C7(INAP)).

Also shown is a single service control point (SCP) 8, although in a typical network several such control points will be provided.

In operation SSP 2 may receive programmed trigger requirements in respect of information concerning the origin or destination of a call in progress. Such triggers result in the SSP communicating by way of signalling paths 9 with one of the network SCP 8 which provide instructions to the SSP for specialised handling of the particular call.

Such networks are extremely flexible since special requirements need only result in minor changes at the SSP 2, major software changes for handling services only being required at the network SCPs.

In the case of the UK PSTN at the date of application four SCPs 8 are provided for the entire network.

Now, if a customer has a plurality of PBXs 20, 22 which use the PSTN to communicate then messages between the first PBX 20 and the other PBX 22 will be in a different signalling system embedded within the network signalling. Thus, C7 (NUP) signalling provides for DPNSS signals to be transferred across the network.

If a virtual private network is established customer premises equipment (CPE) connected to the first PBX 22 may only require to dial a short code to indicate a connection is required to CPE connected to PBX 20. Control means of the PBX 22 will cause the setting up of a call through the network by way of one of the connected DLEs 1a, 1b though the network to one of the DLEs 1c, 1d simply by providing to the DLE 1a a destination telephone number. Alternatively the DLE or the SSP 2 on detecting the origin of the call may cause automatic set up of a link through the network to the destination PBX.

It is here noted that the call through the network will be subjected to usual network routing protection. Thus, if any link between DMSUs 2 fails or a link between a specified DLE 1 and one of the DMSU 2 fails then alternative routing in the PSTN as referenced in the earlier cited European and U.S. patents will occur. Thus the link between the DLEs 1 serving each of the PBXs 20, 22 is protected.

However, any failure of or congestion on the links 31, 32 cannot be accommodated within the AAR or DAR schemes mentioned since the access signalling to the PBXs from the destination DLE results in calls being cleared on an end-to-end basis without the network being able to re-route the call. This arises because DPNSS access signalling under access link failure conditions transmits a congestion (CRM) message from the destination DLE using a C7 (NUP) NEED signalling message. On receipt of the CRM message the originating PBX clears the call removing the possibility of calls being set up using alternative routing.

In the system of the invention, when the SCP 8 is accessed by one of the SSPs 2 for routing information as part of the normal call set up in an intelligent network using a C7 (INAP) IDP signalling message DAR, as previously discussed, is used for routing calls to the DLEs 1c or 1d. Thus, based on the dialled telephone number of the destination PBX and the calling line identity indicating that the source of the call is a PBX within a private network arrangement a route is selected either to the destination DLE 1c or the destination DLE 1D.

The selected DLE (1c or 1d) will be in accordance with a list in which one of the two possible DLEs is marked as a current routing choice.

When the SCP 8 forwards routing information to the SSP 2 to select the current routing choice (say) 1c a further trigger is set at the SSP 2 indicating that any route select failure resulting in a C7 (NUP) (nEED) message causes a route select failure report also to be sent to the SCP 8. If the SCP 8 receives a CRM message indicating that failure has occurred, it causes the other network address i.e. the DLE 1d to be selected as current routing choice and subsequent calls will be routed to the DLE 1d and thence to PBX 20.

Further refinement of the basic algorithm used to select the destination route includes providing counters within the SCP 8 which prevent or limit the rate at which cycling between potential alternative routes occurs in case failure of one of the links from a DLE 1 to PBX 20, 22 results in congestion on the other link causing periodic C7 CRM messages.

A more detailed description of the operation of the SCP 8 on receipt of instruction requests from an SSP 2 or on receipt of failure reports from an SSP 2 now follows. The flow chart shown in FIGS. 2 to 5, used for the purposes of description, show the programming language operators. The operators describe decision making criteria and changes to variables and for the avoidance of doubt have the following meanings

TABLE 1

| OPERATOR | MEANING |
| --- | --- |
| + + | Increment value of variable by 1 |
| - - | Decrement value of variable by 1 |
| = = | Is variable equal to value? |
| ! = | Is variable not equal to value? |
| = | Variable becomes equal to |

Consider then a call arriving for a network number designating the PBX 20 and originating from the PBX 22. At the SSP 2 translation of the number by control means (not shown) of the SSP will result in the destination telephone number and the identity of the PBX 22 being sent to the SCP 8 using C7 (INAP) signalling.

The data table in respect of the destination PBX 20 (and for calls in the opposed direction for the PBX 22 as appropriate) has the following variables:

TABLE 2

| VARIABLE NAME | VALUE | USE |
|---|---|---|
| Last threshold | Selectable (N) | Maximum number of consecutive failed calls |
| Failures threshold | Selectable (M) | Number of failed calls on route after which last threshold is ignored |
| Success 1 | 0,1 | Call on route 1 successful (= 1 if successful) |
| Success 2 | 0.1 | Call on route 2 successful (= 1 if successful) |
| Last_counter_1 | 0 to N | Counts number of consecutive calls failing on route 1 |
| Last_counter_2 | 0 to N | Counts number of consecutive calls failing on route 2 |
| Failures counter 1 | 0 to M | Counts number of calls failing on route 1 |
| Failures counter 2 | 0 to M | Counts number of calls failing on route 2 |
| Choice | 0,1 | Identifies which cycle the call uses |
| Current Route [choice] | 1,2 | An array which identifies which route and cycle combination the call makes use of (1 and 2 are network addresses) |
| Count_Pass_1 | Cyclic 1 to X | Network routing pointer |
| Count_Pass_2 | Cyclic 1 to X | Network routing pointer |

Figure 2A:
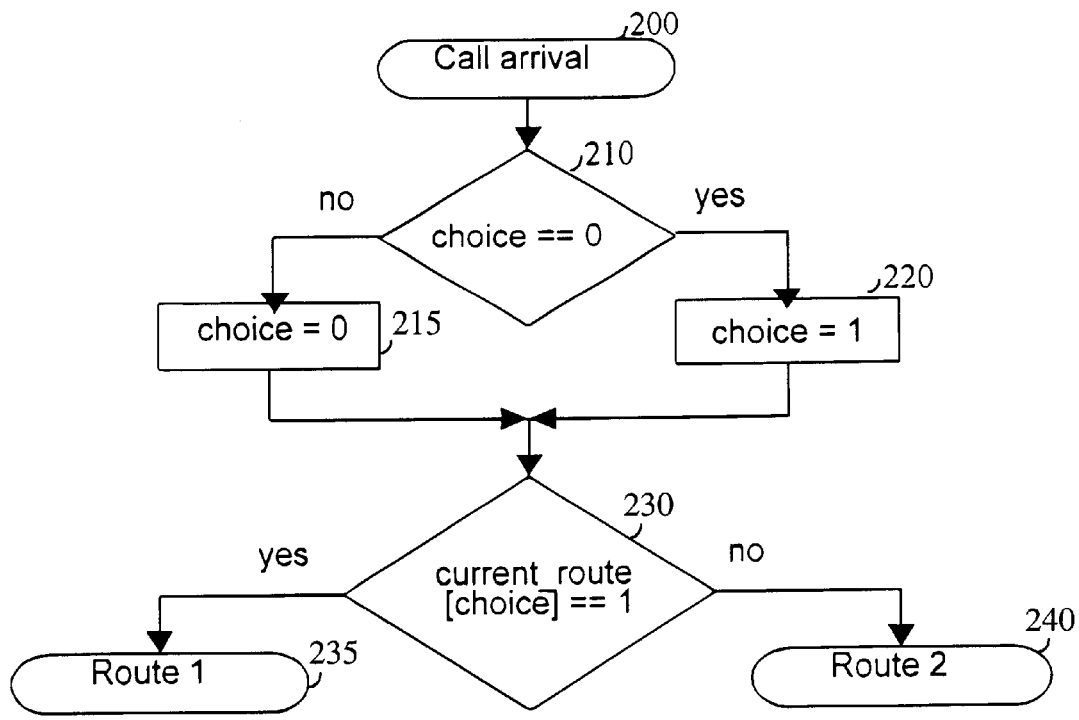
FIGS. 2a, 2b and 2c are flow diagrams showing data flow in a first method of routing.

Referring now additionally to FIG. 2, in a first implementation of dynamic alternative routing on call arrival 200 at the SCP 8, a data table in respect of available routes is consulted in respect of the particular destination telephone number. For simplicity the selection of route is described with reference to only a choice of two routes, that is to say via the DLE 1c or via the DLE 1d of FIG. 1, although it will be appreciated that the PBX 20 may be connected to more than two DLEs and a cycle pointer may be consulted. Thus at step 210 the currently selected cycle choice is considered to determine which is the preferred route for the current call. In the simple case of two potential cycles the choice flag is then reversed at step 215 or 220 in dependence upon the outcome of the interrogation at step 210 indicating the last route used.

The current cycle choice is then used 230 to select from a data table the route through the network to the appropriate destination exchange either DLE 1c or DLE 1d and a timer started in the SCP. The selected route identity is now transferred 235, 240 to the SSP 2 and a trigger set to respond to the SCP if a call failure (C7 (NUP) NEED) signal is received.

If the timer set at step 230 expires without a failure report being received from the SSP 2 then the SCP 8 determines that a successful call has occurred. Considering then if the timer set in the SCP 8 at step 230 expires without receipt of a C7 (INAP) message from the SSP 2 indicating call failure then the SCP 8 assumes that the current call has been successfully set up between the PBX 22 and the PBX 20. Thus, by considering the current route choice flag again (step not shown) a successful call on route 1, as indicated at step 250, results in the success 1 flag being set to 1, the count_pass_1 counter in respect of the successful route being incremented so that on the next application for routing information on route 1 the next network route is selected and finally the last counter appropriate to the route being reset to 0 since a successful call has occurred.

Figure 2B:
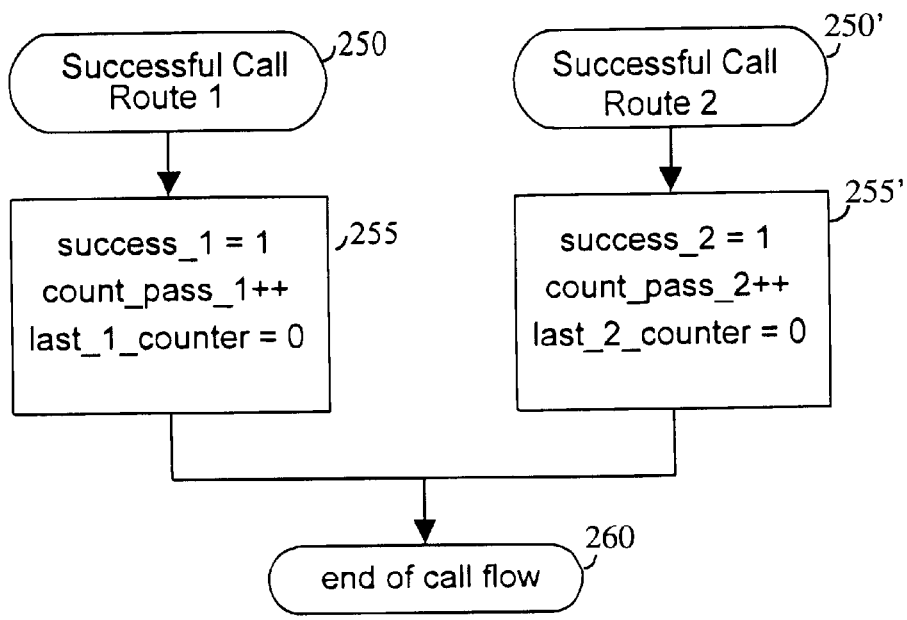
Figure 2C:
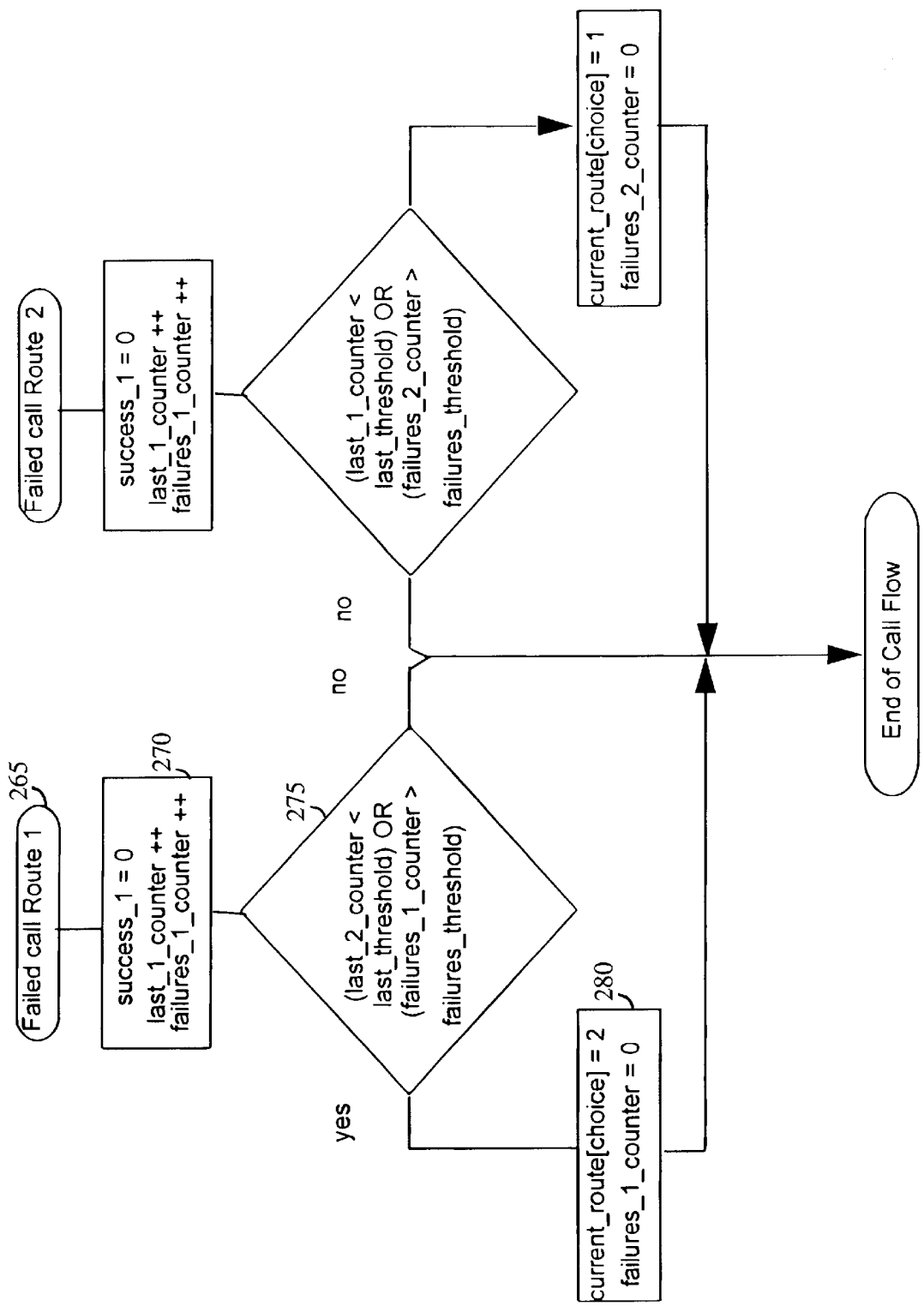

If however prior to expiry of the timer set at step 230 in the SCP 8 a failure message is received then the procedure shown in FIG. 2c is followed. Thus the route used is determined from the current route choice indicator (step not shown) and either the failed call route 1 or failed call route 2 flow is followed within the SCP 8 in dependence upon the route choice. This is believed sufficient to consider only the failed call route 1 flow and to note that if the current route choice was set at 2 the failed call route 2 tables will be used as shown in the right hand section of FIG. 2c. Thus at step 265 the success 1 counter is set to 0, the last 1 counter is incremented by 1 and the failures 1 counter is incremented by 1.

At step 275 the last counter in respect of the alternative route (last_counter_2) is compared with the value of N to determine whether the other route has exceeded the maximum number of consecutive failed calls permissible under normal operating circumstances. If the last_counter_2 is less then the last threshold then the current route choice will be set to route 2 (step 280) so that the next call arriving at the SCP 8 will be directed to the alternative route and the failures counter 1 is reset. Resetting of failures counter 1 ensures that when congestion on route 2 has resulted in route 1 being sequentially selected because there have been more than N failures on route 2 the first route is used until it suffers M sequential failures. Now, provided that on the next application of a call to route 2, route 2 succeeds then as indicated in FIG. 2b at step 255 the last_counter_2 will be reset and the two routes will be alternately selected as previously.

If calls on route 1 continue to fail then last_counter_1 will rapidly reach the last threshold N and calls will be sequentially routed to route 2 until congestions or route failure results in the failures to counter exceeding the failures threshold M.

In summary, the SCP 8 uses current choice routes (route 1, route 2 . . . route N) for a particular destination network address. When a route select failure occurs the next network address in the dynamic alternative routing list is selected and in this way the traffic stream is divided between routes.

The system performs DAR in this manner unless the route to which it would change has had more than last threshold (N) consecutive call fails. If more than N call failures have occurred on the route to which route selected would change then the route selected stays until the failures threshold (M) for the first route is reached. If M failures occur on the first route then the system seeks to switch to alternate routing ignoring the last counter threshold.

Figure 3:
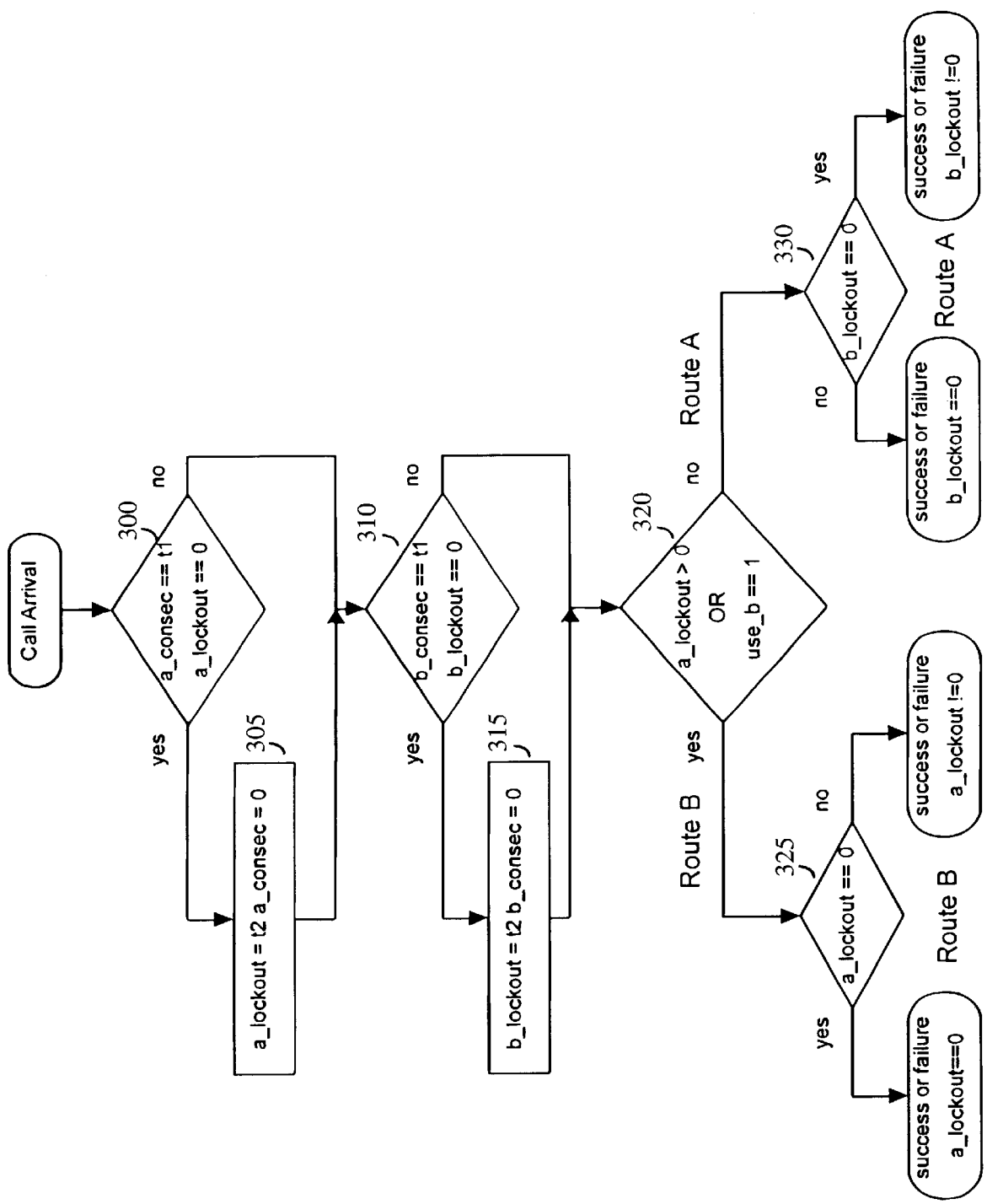
FIGS. 3, 4 and 5 show data flow in a second method of routing.
Figure 4:
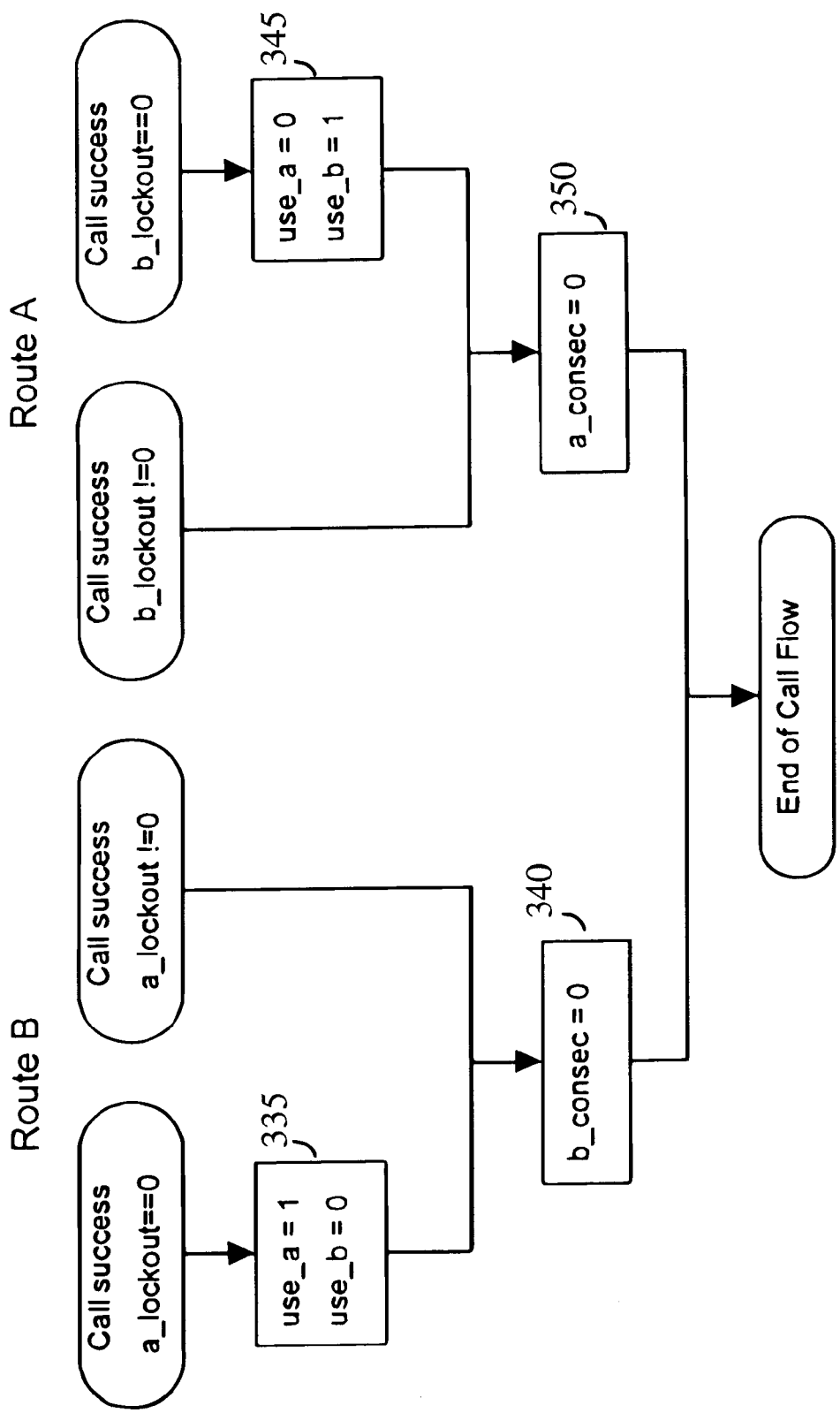
Figure 5:
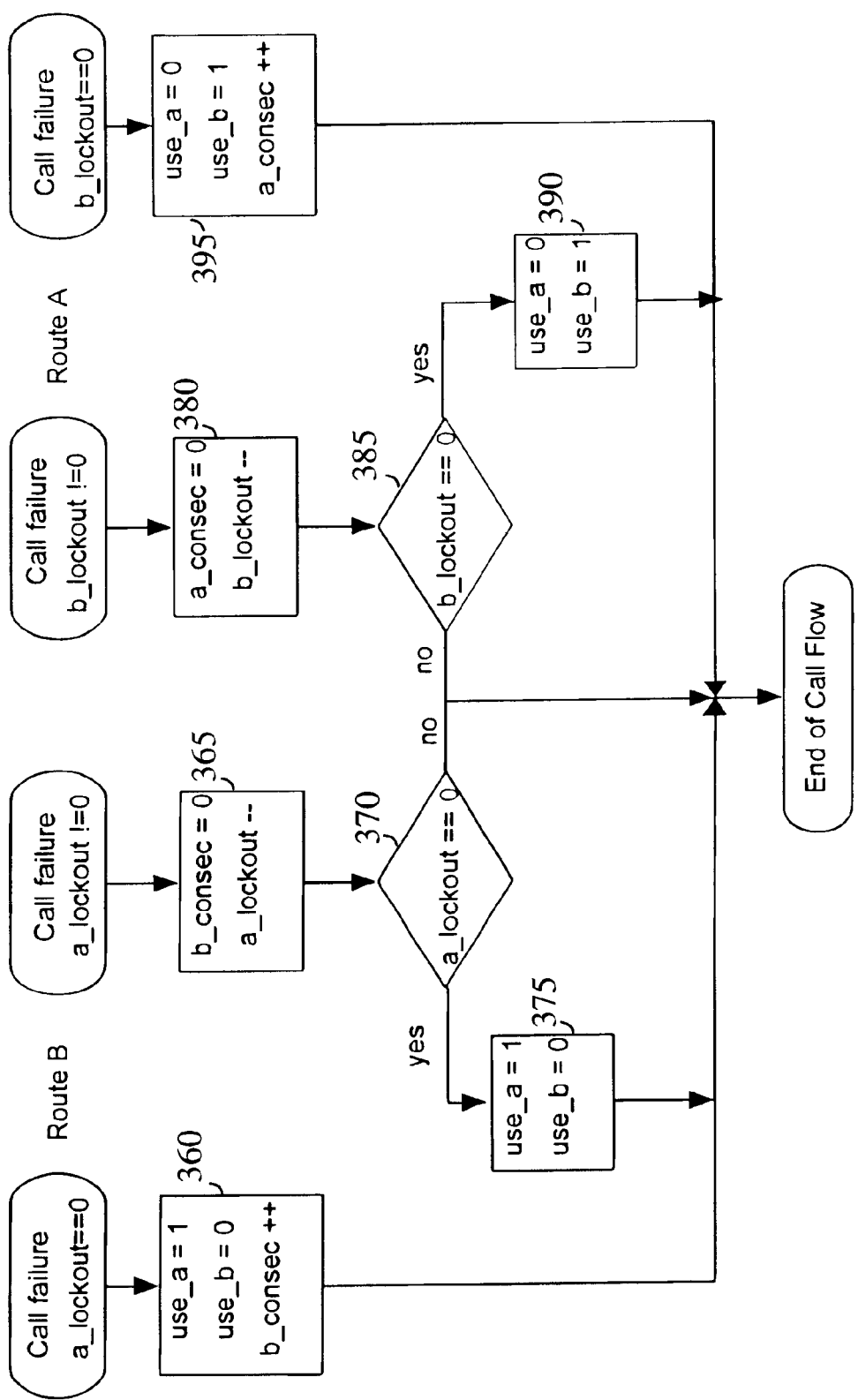

In a further implementation of the invention, referring to FIGS. 3, 4 and 5, the SCP 8 is arranged to allocate traffic sequentially to the destination PBX by way of the DLEs 1 to which it is connected alternately. Thus sequentially arriving calls will be routed in the form route A, route B, route A, route B, . . . unless or until a number of consecutive congestion messages are received. Once a specified number of congestion messages for a particular route have been received traffic is then allocated to the other route. Thus if the congestion threshold is set to three then traffic may be routed A, B, A, B A congested, B, A congested, B A congested, B, B, B . . . this will occur until congestion or route failure then occurs on the second route at which point sequential allocation of traffic is re-attempted.

TABLE 3

| VARIABLE | POSSIBLE VALUES | USE |
|---|---|---|
| T1 | User defined | Defines maximum number of consecutive failed calls on route before the route is no longer used |

TABLE 3-continued

| VARIABLE | POSSIBLE VALUES | USE |
| --- | --- | --- |
| T2 | user defined | Total number of failures allowed on fail over route before failed route is re-used |
| A_consec | 0 to T1 | Counts number of consecutive call failures on route A |
| B_consec | 0 to T1 | Counts number of consecutive call failures on route B |
| A_lockout | 0 to T2 | When A_consec = T1, A_lockout = = T2 route A is not used until A_lockout = 0 (value decremented by failed calls on B) |
| B_lockout | 0 to T2 | When B_consec = T1, B_lockout = = T2 route B is not used until B_lockout = 0 (value decremented by failed calls on B |
| Use_A | 0,1 | If use_a = 1 then call is routed down route A |
| Use_B | 0,1 | If use_B = 1 call is routed down B |

NB: Use_A and use_B are mutually exclusive such that if one is set to 1 the otheris set to 0.

Referring again to FIG. 1 and also to FIG. 3 and with reference to Table 3 above, when a call arrives at an SSP 2 and is identified as a call between the PBXs 20, 22 a C7 (INAP) message is sent to the SCP 8 and upon the call arrival the SCP 8 consults, at step 300, the A_consec Counter to determine whether it is at the value set in the T1 field for the maximum number of consecutive failed calls on the route. If A_consec counter does not equal T1 then the SCP 8 steps to interrogate the B_consec counter at step 310 to determine whether B_consec is equal to T1 and if not proceeds to the route select step at 320. If at step 300 A_consec is equal to T1 and A_lockout counter is equal to 0 then this would indicate that T1 calls have failed consecutively in attempting to take the first selected route. Thus at step 305 the A_lockout counter is set to the value T2 and the A_consec counter is set to 0.

The A_lockout counter will be stepped down by one each time a call fails on the alternative failure route B. Note also that so long as the A_lockout counter has not been stepped to 0 step 305 is not reached.

Similarly at step 310, if T1 calls have failed consecutively on the second route then the B_lockout counter is set to T2 and the B_consec call counter is reset.

Once step 320 is reached, if A_lockout is greater than 0 or the use_B flag is set to 1 then at step 325 routing information selected from the route table is returned to the SSP and the status of A_lockout counter determines the next macro function to be carried in the SCP 8 either on expiry of a time out period during which no failure message is returned to the SCP 8 or in the event of a failure on route B. Similarly, if use_B is not equal to 1 provided that A_lockout counter is at 0 then route A is used as the preferential route between the PBXs, and at step 330 a timer is commenced and routing instructions are returned to the SSP to cause the A route to be used.

Assuming that a route B call is successful, that is to say the timer in respect of the call expires without a C7 (INAP) CRM message being received then the SCP 8 follows the procedure shown in FIG. 4. Thus if route B was used for the setting up of the call, if the A_lockout counter is equal to 0 then the use_A and use_B flags are toggled so that the next call will use route A. This is shown at step 335. The B_consec counter is set to 0 regardless of its previous setting because a call on route B has now been successful as shown at step 340. If however the A_lockout counter is not equal to 0 then the use_B flag remains at 1 but step 340 at which B_consec is reset to 0 is still followed. Similarly, a successful call using route A will causing toggling of the A and B usage flags if B_lockout is equal to 0 and the A_consec counter will be reset to 0 at step 350.

If however a call fails, referring now also to FIG. 5. if A_lockout counter was previously at 0 when route B fails then the use_A and use_B flags are toggled so that the next call will be directed to route A and the B_consec counter is incremented (step 360).

If however a call failure occurs on route B when the A_lockout counter has not reached 0, then at step 365 the B_consec counter is set to 0 even though the call has failed and the A_lockout counter is decremented. This ensures that route B will continue to be used until T2 calls on a route B have failed before any attempts is made to re-use route A following its previous failure.

At step 370 if the A_lockout counter has reached 0 then the use_A and use_B flags are toggled (step 375) so that the next call arrival will at step 320 be directed to route A. Thus if calls continue to fail on route B, provided that calls no longer fail on route A then route B will quickly reach the lockout condition and calls will then solely be offered to route A until such time as T2 failures of route A occur.

Thus considering a call failure on route A, as for route B, if B_lockout counter is not equal to 0 then A_consec is forced to 0 B_lockout is decremented at step 380 and at step 385, unless B_lockout as reached 0, the use_A flag remains set.

If T2 failures have occurred on route A since the last B_lockout setting, then at step 390 the use_A and use_B flags are toggled so that the next call isoffered to route B and then calls alternate between the routes. If both routes are in failure mode calls will continue to be offered alternately to the routes until either A_consec or B_consec equals t1. When either counter equals t1 then calls are offered to the other route until t2 calls on that route fail when consecutive calls are again shared between the routes.

Again if B_lockout counter was equal to 0 then a failed on route A results at step 395 in the use_A use_B flags being toggled so that the next call is offered to route B and the A_consec counter being incremented.

As previously, referring back to FIG. 3, if the A_consec counter becomes equal to T1 at step 300 then the A_lockout counter will be set to T2 at step 305.

It will be appreciated that the selection of routes between PBXs in a virtual private network in the manner described is additional to any network automatic alternative routing or dynamic alternative routing plans between individual DLEs. Thus, there will be several potential routes between, for example, the DLE 1*a* and the DLE 1*c* and similar between the DLE 1*a* and the DLE 1*d* and respectively between DLE 1*b*, DLE 1*c* and DLE 1*d*.

By introducing selective routing from the source DLE to the destination DLE to be used to access the respective PBXs a high security virtual private network utilising the PSTN can be provided.

While as hereinbefore described reference is made to calls between PBXs, it will be appreciated that any destination PBX may be provided with connections to multiple destination telephone exchanges whereby any calls to the telephone number allocated to that PBX may be direct alternately through the destination exchanges. It will also be appreciated that the system may be expanded to allow connection to more than two local exchanges and may also be used to provide secure connection for any customer equipment capable of connection to a plurality of lines.

It will be noted that in this case the locking out of failed routes may require multiple comparative lockout counters to be used. Thus considering for example a system having four destination A,B,C,D then when route A fails there may be counters A_lockout(B), A_lockout(C) and A_lockout(D) which will be respectively decremented when calls on routes B,C and D fail. A may remain locked out until all three counters reach zero. Another method of operation may use a single lockout counter which is decremented each time a call fails on any other route.

In a still further adaptation of the invention, the re-instatement of a failed route may not be dependent upon calls failing on other routes but may be a lockout for a pre-determined period of time after which calls may again be offered to the route, each route being locked out on consecutive or proportionate failure (subject to other routes remaining available).

Alternatively, calls may be offered to a previously locked out route after a predetermined number of calls overall have been offered for connection through the network to the PBX.

In another adaptation, lockout of a route may not be based entirely on consecutive call failures. For instance, it is possible to use a thresholding system whereby if x of the most recent y calls have failed (notwithstanding say fail, success, fail, fail, success, fail) for example the route is not attempted for a period of time, or until other routes have failed or until a specxified number of calls have been offered through the network.

What is claimed is:

1. A method of routing calls in a communications network in which a destination has a single network number representing a single call termination location, the destination having a plurality of network addresses, each network address representing a connection to a respective destination telephone exchange, the method comprising, on receipt of a call for a destination:

analysing the destination number to select one of the plurality of network addresses to which the call is to be directed, the selection being made so that the call is directed to a different one of the plurality of network addresses for that destination to which an immediately preceding call was directed, whereby each network address is used in turn, selecting a route through the network to the selected network address and monitoring network signals to determine whether the call connection is a success or failure, and, on detection of failure of the call, determining whether previous calls to the selected network address have failed on a number of attempts which exceeds a predetermined threshold and, if the threshold is exceeded, barring subsequent calls to the selected network address until at least one further predetermined network parameter relating to the network address has been reached.

2. A method of routing calls as in claim 1, in which the predetermined network parameter comprises a number of calls directed to at least one other of the plurality of network addresses having failed a predetermined number of times.

3. A method of routing calls as in claim 2, in which a respective consecutive failures counter is incremented on each call failure and is reset on each call success, the consecutive failures counter value being compared with a predetermined value to determine whether calls to the respective network address are barred.

4. A method as in claim 2 wherein, upon barring of calls to a network address, a respective lockout counter is set to a predetermined value, the lockout counter being decremented on each failure of a call offered to a different one of the plurality of network addresses.

5. A method of routing calls as in claim 4 wherein, if only one of the plurality of network addresses has its respective lockout counter at zero, each respective lockout counter of the other routes is decremented on failure of a call offered to the network address and the respective consecutive failures counter for that address is reset so that calls continue to be offered to said network address until the respective lockout counter of at least one other of the at least two network addresses reaches zero.

6. A method of routing calls as in claim 1, in which the predetermined network parameter comprises a time period, a timer being set on lockout of a route and calls being barred to that route until the timer has expired.

7. A method of routing calls as in claim 1, in which the predetermined network parameter comprises the number of calls being offered for connection to the network number whereby calls are not offered to a locked out route until a predetermined number of calls have been offered to the network for connection to the destination.

8. A telecommunications network comprising:

a multiplicity of local exchanges interconnected by a plurality of trunk exchanges such that calls arising on any network address designating a customer connection to one of the local exchanges are connectable to any other network address in the communications system, the system translating digits defining a telephone number received from any network address into a destination network address to permit the establishment of a communications call between a calling network point and a destination network point, wherein at least one telephone number represents a plurality of network addresses, at least some of which are on a first of said local exchanges and at least some others of which are on a different one of said local exchanges, each of said network addresses representing a route to a common customer communications equipment destination, control means of the network being responsive to signals received indicating a call for said customer equipment of:

analyse the number to select which of the plurality of network addresses to which the call is to be directed, the selection being made so that the call is directed to a different one of the plurality of network addresses for that destination to which an immediately preceding call was directed, whereby each network address is used in turn, causing a route to be set up through the network to the selected network address and monitoring network signals to determine success or failure of the call and, in the event of failure, determining from data relating to the selected network address if the number of failed calls exceeds a predetermined threshold and, if the number of failures exceeds said predetermined threshold, barring subsequent calls to the selected network address until a predetermined network parameter has reached a predetermined level.

9. A telecommunications network as in claim 8, in which the predetermined network parameter comprises a predetermined number of calls to one more other routes that have failed.

10. A telecommunications network as in claim 8 in which the predetermined network parameter comprises the number of calls offered for connection to the telephone number.

11. A telecommunications network as in claim 8 in which the predetermined network parameter comprises a predetermined period of time.

12. A telecommunications network as in claim 8 in which the network includes:

a service control point which stores information relating to specific destination telephone numbers, each of which represents a connection to a customer PBX, trunk switching units comprising service switching points, responsive to triggering on receipt of predetermined telephone numbers, to cause access to the service control point and, responsive to signalling received from the service control point, to effect connection through the network to a destination local exchange, the service control point storing in respect of each such telephone number a plurality of network addresses and selecting a route through the network to the selected network address.

13. A telecommunications network as in claim 12 wherein:

upon transmitting a selected route to a service switching point in respect of a received call, the service control point commences a timer and, if the timer expires prior to receipt of a failure message from the service switching point, determines that the call has been successful.

14. A telecommunications network as in claim 8 wherein: on receipt of a failure message from the service switching point, the service control point increments a respective consecutive call counter and, if the counter values exceeds a predetermined number and if a respective lockout counter related at least one alternative network address is set to zero causes the respective lockout counter for the currently selected network address to be set to a predetermined lockout value.

15. A telecommunications network as in claim 14 wherein each time a failure message is received for a call to a currently selected network address, any respect lockout counter related to any other network address which is not at zero is decremented.

\* \* \* \* \*